9-16-75    XR    3,906,510

United States Patent [19]
Hattori et al.

[11] 3,906,510
[45] Sept. 16, 1975

[54] RECORDING METHOD BY PHOTOSENSITIVE MATERIALS

[75] Inventors: Shuzo Hattori, Nagoya; Mikio Eto, Tokyo; Kenji Morino, Chiba; Tuyoshi Fujita, Hachiohji, all of Japan

[73] Assignees: Oriental Photo Industrial Co., Ltd.; Kimmon Electric Co., Ltd., both of Tokyo, Japan

[22] Filed: June 20, 1974

[21] Appl. No.: 481,274

[30] Foreign Application Priority Data
June 23, 1973   Japan.............................. 48-71177
June 23, 1973   Japan.............................. 48-71178

[52] U.S. Cl..................... 346/1; 96/84 R; 346/108; 350/311
[51] Int. Cl.²......................................... G01D 9/20
[58] Field of Search ........ 346/1, 108, 107; 96/84 R, 96/84 UV; 331/94.5, DIG. 1; 73/432 L; 350/311

[56] References Cited
UNITED STATES PATENTS
3,064,260   11/1962   Heiland............................ 346/109
3,277,494   10/1966   Stauffer ............................ 346/108
3,587,424    6/1971   Paine ..................... 331/94.5;DIG. 1

*Primary Examiner*—Joseph W. Hartary
*Attorney, Agent, or Firm*—Woodhams, Blanchard and Flynn

[57] ABSTRACT

A method for recording movements of objects or datum lines is provided which comprises employing a photodevelopable photosensitive material, a dye filter having strong absorption in the ranges of wavelengths excluding the vicinity of the wavelength of the laser ray employed for the first exposure of light and a laser, such as helium-cadmium laser, fixing said photosensitive material protected from outdoor light by said filter to the object, and printing the datum point formed by the flux of the laser ray emitted from the laser on said photosensitive material through the filter as the line for indicating the movement of the object or as the datum line.

8 Claims, 10 Drawing Figures

RECORDING METHOD BY PHOTOSENSITIVE MATERIALS

The present invention relates to a method for recording movements of objects or datum lines by photosensitive materials. More particularly, the present invention relates a method for recording movements of objects outdoors very rapidly and accurately by employing a photodevelopable photosensitive material and a laser.

In civil engineering, soil mechanics, vehicle engineering, etc., the observation and measurement of moving objects have been conducted by a collimation method using a telescope provided with a water pipe, but in case where it is impossible to set an immobile point in the vicinity of the moving object or it is difficult to attach measurement instruments to the moving object, it is very difficult to effect the measurement with a measurement precision of about 0.1 mm according to this method.

Recently, a method for determining a horizontal or vertical line by employing a laser has recently been developed rapidly instead of the conventional collimation method using a telescope provided with a water pipe, because the operation can be performed very easily. The datum line formed by using a laser is different from a virtual datum line formed by the collimation, and it includes the possibility of being printed and recorded by employing a photosensitive material.

In such state of the art, development of a technique which will make it possible to print and record a datum line formed by a laser on a photosensitive material has been greatly demanded, and many proposals have been made. However, most of the above-mentioned measurement operations are conducted outdoors under sun light, and the measurement method of this type is characterized in that a complicated or heavy measurement tool or instrument, other than a photosensitive material, is not attached to an object to be measured. Accordingly, it is difficult to protect the photosensitive material from outdoor light. For this reason, sufficient results have not yet been attained by known prior art methods.

As is well known in the art, a printing-out photosensitive material of the photodevelopment type including a silver halide as the photosensitive element is a special photosensitive material in which a printed-out image is formed by subjecting it to a high-illumination short-time light exposure (i.e., first exposure of light) to form a primary latent image and then subjecting the latent image to a low-illumination light exposure (for instance, under an indoor fluorescent lamp) to effect photodevelopment.

Photosensitive materials of this type are now used frequently in the field of the oscillographical recording.

The characteristic feature of photosensitive materials of the photodevelopment type is that, although in the case of photosensitive papers including conventional silver halide photosensitive materials the dark chamber operation should be inevitably conducted and the wet development treatment must be performed, in the case of photosensitive materials of the photodevelopment type it is possible to conduct the development operation under illumination of a room lamp and all the treatments can be performed according to the dry method.

However, these photosensitive materials of the photodevelopment type can not be used outdoors, because the obtained images are poor in preservability and when they are exposed to light for a long time, they gradually disappear.

Another defect of photosensitive materials of this type is that if they are subjected to an instantaneous radiation of light including a large quantity of ultraviolet rays, such as sun light, prior to the first light exposure, the photographic sensitivity is drastically degraded in the photosensitive materials.

Because of such defects, outdoor uses of photodevelopable photosensitive materials of this type are much limited.

Recently, recording and measurement are frequently conducted outdoors, and the development of photosensitive materials of this type which can be used conveniently for such outdoor recording and measurement has been greatly demanded. As examples of such outdoor recording and measurement, there can be mentioned recording of automobile running tests, various measurements in construction fields, and the like.

Accordingly, the purpose of the present invention is to provide a novel method for conducting the accurate, rapid measurement and recording of movements of objects by employing photodevelopable photosensitive materials that were protected from outdoor lights and a laser, thus enabling the observation and measurement with high precision of moving objects in civil engineering, soil mechanics and vehicle engineering, etc. such as recording of automobile running tests and various measurements in construction fields.

The present invention relates to a method for recording movements of objects or datum lines characterized by employing a photodevelopable photosensitive material, a dye filter having strong absorptions in the ranges of wavelengths except the vicinity of the wavelength of the laser ray employed for the first light exposure and a laser, attaching said photosensitive material protected from outdoor light by said filter to the object to be measured, and printing the datum point formed by the flux of the laser ray emitted from the laser on said photosensitive material through the filter.

As well known in the art, the photodevelopable photosensitive materials to be used in the present invention is a silver halide photosensitive material in which a latent image is formed by subjecting it to a high-illumination short-time light exposure (first exposure) such as, for example, super high pressure mercury lamp, xenon flash, high illumination tungsten ray, laser ray and then subjecting the latent image to a low-illumination light exposure such as fluorescent lamp and reflected natural light to effect photodevelopment by intensifying said latent image and converting it to a visible image. These photosensitive materials to be used in the present invention should contain preferably more than 50 mol % of silver bromide and can also contain silver chloride and iodide. Further, the average diameter of silver halide particles is usually about 0.1 to 10μ, preferably about 0.5 to 1μ.

These photodevelopable photosensitive materials contain halogen acceptors in their photographic emulsions, such as stannous chloride, cadmium chloride, thiosemicarbazide, hydrazines, urasol, etc. (Refer to, for example, U.S. Pat. Nos. 3,305,365; 3,241,971; 3,579,348; 3,396,017; 3,033,682; 3,178,292). Of course, the photodevelopable photosensitive material to be used in the present invention is not limited to those disclosed in the above U.S. Patents, and other well known photodevelopable photosensitive materials can be used.

Further, in accordance with the present invention, a light shielding dye filter is covered over the photosensitive surface of the printing out photosensitive material of the photodevelopment type, or a composite photosensitive material is prepared by forming a dye filter layer directly on the surface of said photosensitive material, and the photosensitive material is exposed imagewise to the first exposure of light through the dye filter to form a latent image and then a printed-out image is formed by the secondary exposure.

As the dye to be used in preparing the above dye filter, a dye or mixture of dyes having an absorption wavelength region corresponding to the photosensitive wavelength region of the photodevelopable photosensitive material.

These dyes can be used singly or in the form of mixtures of two or more of them, so that said absorption wavelength region will be covered. Preferably, a combination of a yellow dye and a red dye should be used. As examples of such filter dye, there can be mentioned Tartrazine (having absorption maximum at 426 m$\mu$), Erythrocin (having absorption maximum at 526 m$\mu$) and New Coccine (having absorption maximum at 507 m$\mu$). Of course, other dyes can be used.

The optimum concentration of the dye in the dye filter layer is determined depending on the strength of the laser ray, outdoor conditions and sensitivities of the photosensitive materials, etc.

In preparing a light-shielding dye filter layer, it is possible to employ a ultraviolet absorber in combination with the above dye.

As the filter base to be used for preparing a light-shielding dye filter, there can be employed a transparent support such as acetyl cellulose films, polystyrene films, polyethylene terephthalate films and glass.

In preparing the dye filter layer, a light-shielding dye or a mixture of dyes is dissolved in a binder resin, and the solution is coated on such filter base or directly on the photosensitive film surface of a photodevelopable photosensitive material.

As such binder resin, there can be used gelatine, polyamide resins, butyral resins, polyvinyl acetate resins, polyacrylate resins, polyvinyl chloride resins, polymethyl methacrylates, polyvinyl pyrrolidones, ethyl cellulose, cellulose acetate, polyvinyl alcohol, etc. and, as the solvent, there can be used water, ketones, alcohols, esters, and aromatic hydrocarbons, etc.

A printing-out photosensitive material covered with the above-mentioned light-shielding dye filter or a printing-out photosensitive material having the above-mentioned light-shielding dye filter contacted directly with the photosensitive film thereof can be safely handled outdoors under illumination of sun light.

In a preferred embodiment of this invention, there is provided a method for recording movements of objects by utilizing in combination a ray of 442 nm wavelength emitted from a recently developed helium-cadmium laser, the spectral sensitivity characteristics of a photodevelopable photosensitive material and the spectral absorption characteristics of a dye filter, according to which the photosensitive material can be sufficienty protected and simultaneously a clear printed image can be formed by the flux of the laser ray. Further, this invention provides means for forming a datum line or plane necessary for various measurements by the sweeping of the laser flux and also means for enabling the precise recording of the movement progress by a time marker.

The principle and effects of this invention will now be illustrated by reference to the accompanying drawing.

Figure 4A:
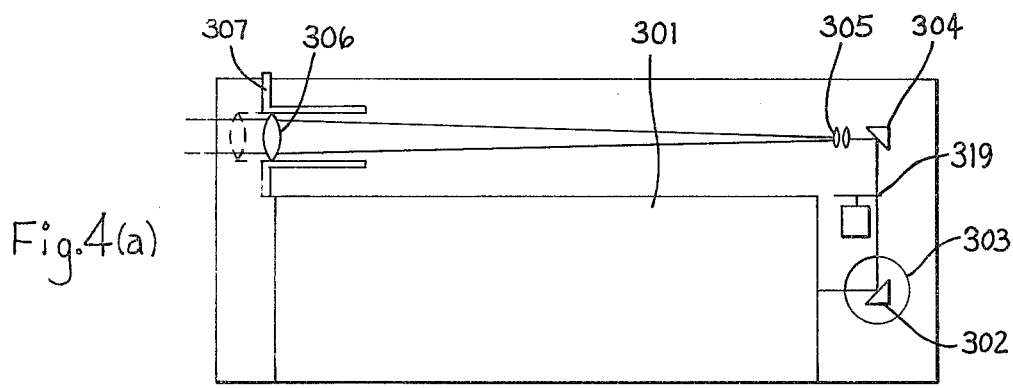
Figure 4B:
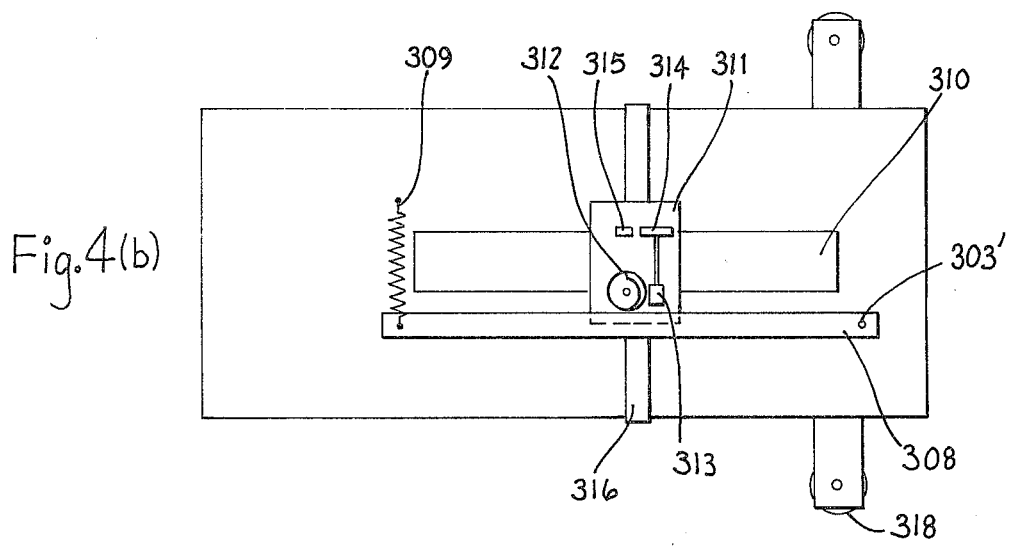
Figure 4C:
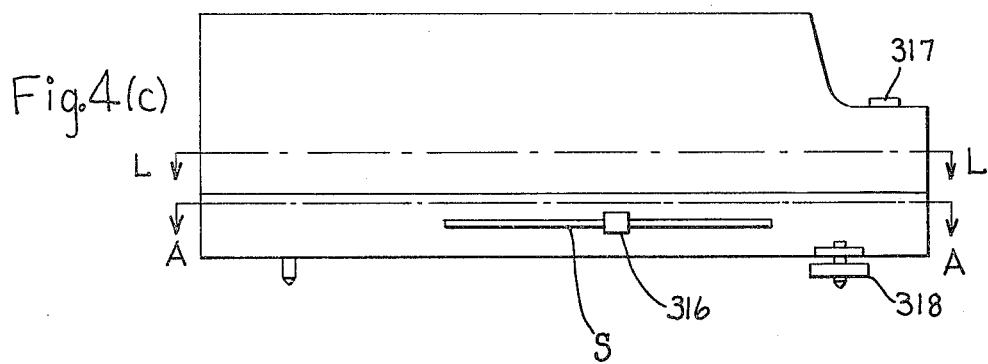

FIG. 4, (a) to (c) show an embodiment of a helium-cadmium laser to be used in the method according to the present invention and (c) is a side view, (a) is a crosssectional plan view along the line L-L in FIG. 4 (c) and (b) is a cross-sectional plan view along the line A—A in FIG. 4 (c).

Figure 5A:
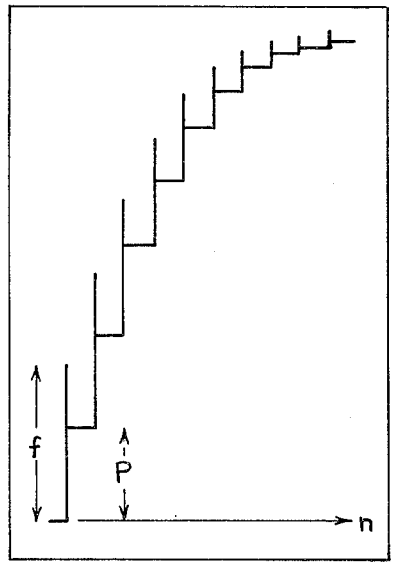
Figure 5B:
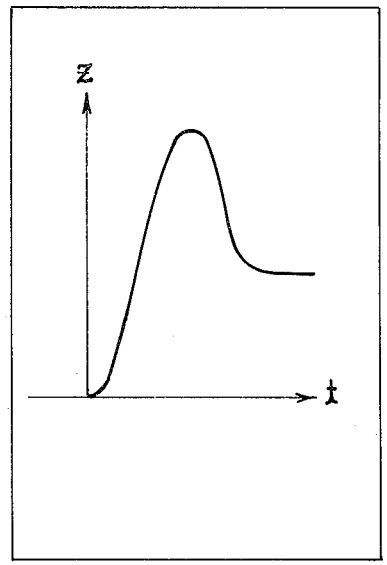
Figure 5C:
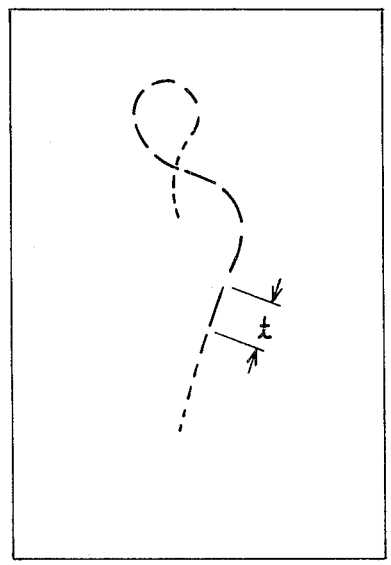

FIG. 5, (a) to (c) illustrate various examples of the recording of the movement of the object.

Figure 6:
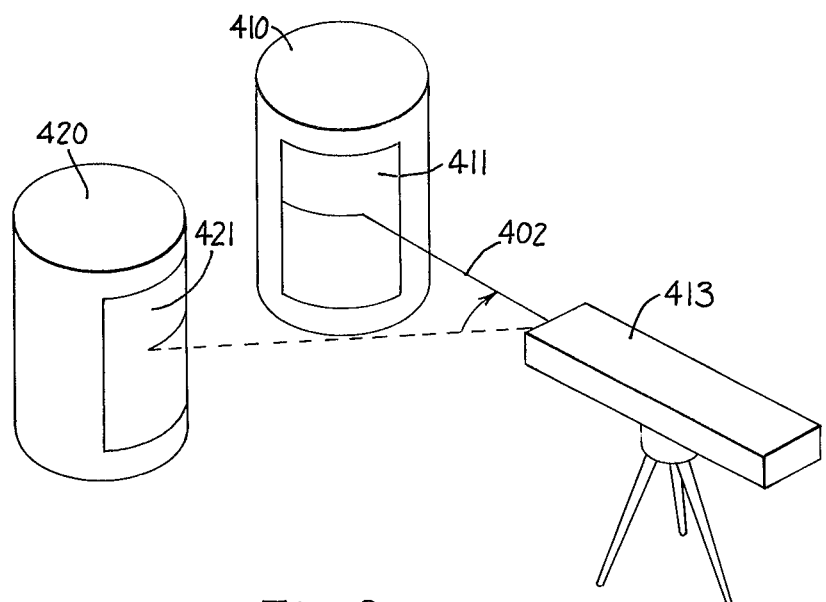

FIG. 6 is a diagram illustrating another embodiment of the method according to the present invention.

Figure 1:
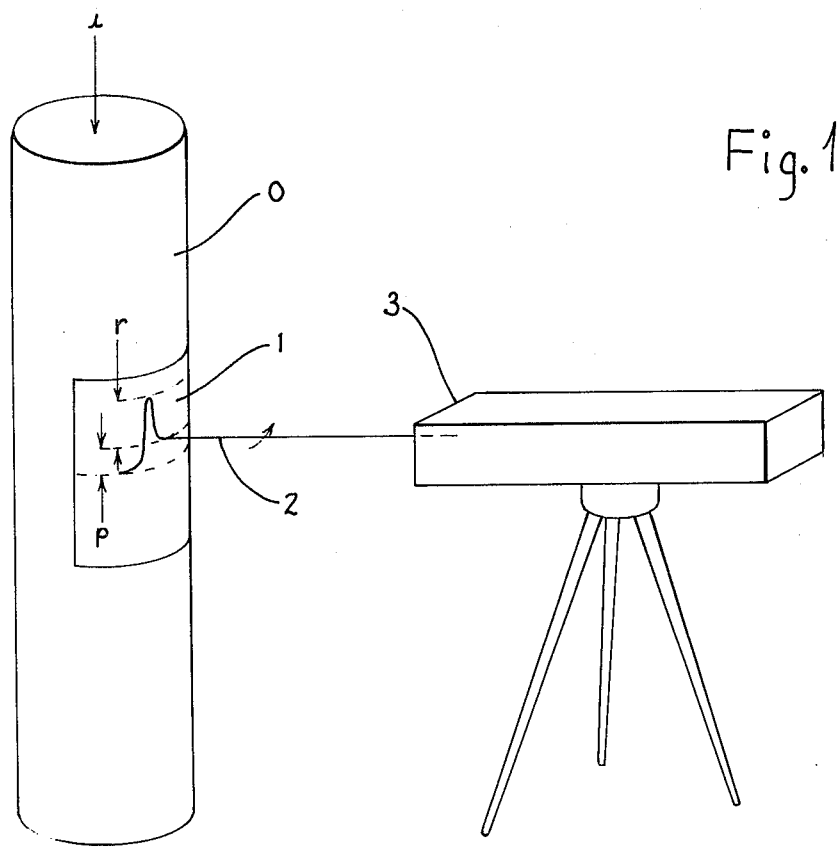
FIG. 1 is a diagram illustrating the principle of this invention by reference to an embodiment in which the method of this invention is applied to the recording of the movement of a pile for foundation work.

FIG. 1 is a diagram illustrating the principle of this invention is connection with an example in which the method of this invention is applied to the recording of the movement of a pile for foundation work.

Percussion is imparted at a high acceleration to a pile for foundation work, and hence, the pile for foundation work is an instance of an object to be measured in which it is impossible to attach a heavy measurement instrument to the object to be measured and it is difficult to set an immobile point in the vicinity of the object to be measured. However, the movement of the pile against the percussion gives an important information concerning the qualities of the soil and the measurement of its penetration and re-bounding is an important measurement, based on which the drag of the pile can be calculated.

Referring to FIG. 1, a flux 2 of a ray of 442 nm wavelength emitted from a helium-cadmium laser 3 moves at a constant rate in the horizontal plane and prints a datum line on a photodevelopable photosensitive film 1 protected by a dye filter. The photosensitive film 1 is bonded and fixed to a pile o. When percussion i is given to the pile o, a graph illustrating the relation between the movement of the pile in the vertical direction and the lapse of time is recorded on the photosensitive film 1 as shown in the drawing. In the drawing, the arrows p indicates the quantity of penetration and the arrows r indicates the quantity of re-bounding. In this embodiment, the direction of the movement of the object is constant and a continuous sweep mechanism of the laser is employed for transferring the flux of the laser at a constant rate and in a plane vertical to the direction of the movement of the object.

Figure 2:
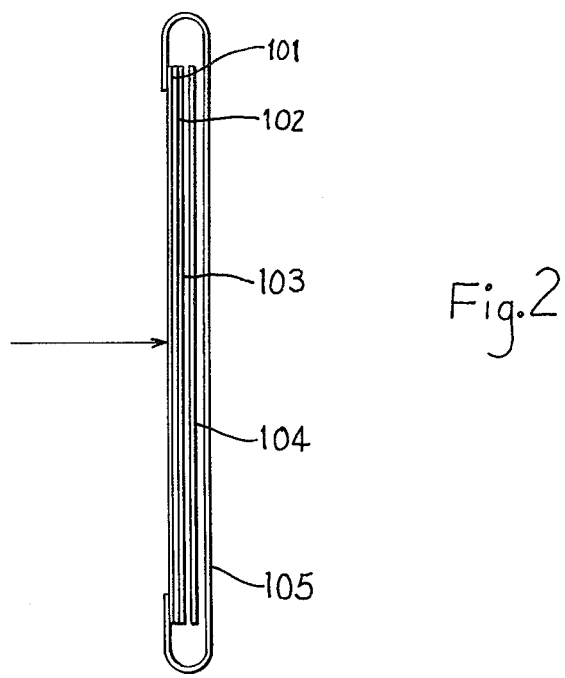
FIG. 2 is a diagram showing the cross-section of a photosensitive material protected by a dye filter to be used in the method of the present invention.

FIG. 2 is a diagrammatic view showing the cross-section of the photosensitive material protected by a dye filter. A photodevelopable photosensitive film 104 is contained in a black paper bag 105, and the dye filter consisting of 101 to 103 are disposed in a window formed on the black paper bag 105. 103 indicates a polyester film substrate, 101 indicates a dye film having an absorption region on the side of wavelengths longer than 442 nm, and 102 indicates a dye film having an absorption region on the side of wavelengths shorter than 442 nm. The dye filter need not be divided into three layers of 101 to 103 as shown in the drawing, but a mono-layer dye filter dyed with a mixture of dyes can be employed. In the drawing, the arrow indicates the direction of incidence of a flux of a laser ray of 442 nm wavelength.

Figure 3:
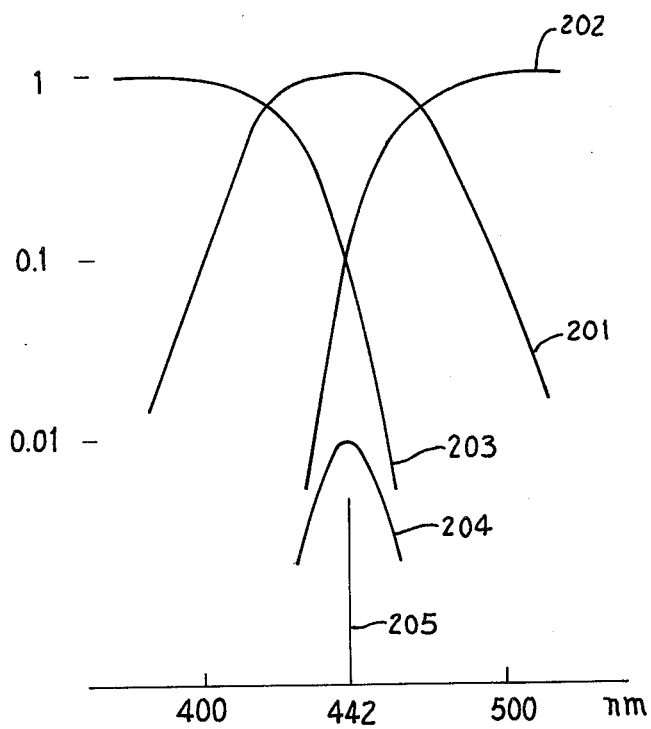
FIG. 3 is a diagram illustrating the relation among the spectral sensitivity characteristics of the photosensitive material, the spectral absorption characteristics of the dye filter and the wavelength of a ray of a heliumcadmium laser.

FIG. 3 is a diagram illustrating the relation among the spectral sensitivity characteristics of the photosensitive material 104, the spectral absorption characteristics of the dye films 101 and 102 and the wavelength of a ray of a helium-cadmium laser. Both the sensitivity and the absorption is logarithmically graduated. The curve 201 indicates the spectral sensitivity characteristics of a photosensitive material 104 including silver bromide as a main photosensitive element. The curve 202 indicates the spectral absorption characteristics of the dye film 101 and the curve 203 indicates the spectral absorption characteristics of the dye film 102.

The curve 204 indicates the phtosensitivity characteristics of an assembly of the dye filter 101–103 and the photosensitive material 104, and 205 shows the wavelength of a ray of the helium-cadmium laser. From the photosensitive characteristics curve 204 of the assembly of the dye filter and photosensitive material, it will readily be understood that this assembly is safe to outdoor light and exhibits a sufficient sensitivity to the wavelength of the laser ray even when it is exposed to light outdoors for about 30 minutes.

FIG. 4 is a diagram illustrating one preferred embodiment of a helium-cadmium laser to be used in the method of the present invention. As shown in FIG. 4 (a), a flux emitted from a helium-cadmium laser 301 is reflected by a rotary reflection mirror 302 and further reflected by a fixed reflection mirror 304. Then, it is introduced into a convex lens 305. The flux focussed tentatively by the convex lens 305 is focussed on a photosensitive film by an object lens 306. A knob 307 is provided to move the object lens 306 to adjust the focus. The rotary reflection mirror 302 is fixed on a rotary stand 303. A lever 308 [in FIG. 4(b)] fixed by the pivot 303' on the rotary stand 303 is drawn back by a spring 309 and pushed out by a cam 312. The operation point of the cam 312 can be changed by a moving stand 311 movable on a rail 310. The moving stand 311 can be manually moved by a handle 316 along the slit S. The cam 312 is driven by a worm gear 313, and the worm gear 313 is driven by a motor 314 and is stopped after one rotation by means of a relay 315. The motor is started by putting on a manual switch. The optical axis is adjusted so that when an adjustment screw 318 is adjusted so that a water pipe 317 shows the horizontal state, the flux coming from the object lens 306 is always included in the horizontal plane. A rotary chopper 319 shuts the light passage at every prescribed interval to print a time marker on a record.

FIG. 5 (a) to (c) illustrate various examples of the recording methods of the movement of the object. FIG. 5-(a) shows the record of the movement of a pile for foundation work, in which the abscissa indicates the frequency of percussion(n), f indicates the total movement by one percussion, and p indicates the amount of penetration. Every time when one percussion is completed, the motor 314 shown in FIG. 4 is started to sweep the flux only by a prescribed amount. This is an example of recording the movements of an object moving in a constant direction, wherein a sweep mechanism such as shown in FIG. 4 (b) is employed for transferring the flux of the laser in a plane vertical to said movement direction, and the datum point is transferred by every division of the movement of the object by means of said sweep mechanism and each division of the movement is printed on the photosensitive material as shown in FIG. 5 (a).

FIG. 5-(b) also illustrates the record of the movement of a pile for foundation work, in which the abscissa indicates the time (t) and the ordinate indicates the movement of the pile (z). The moving stand 311 shown in FIG. 4 (b) is located at a position closest to the rotary stand 303, and the percussion is given during the rotation of the motor 314. In this case the sweep mechanism is continuously operated at a constant rate, and the movement of the object is printed as a graph showing the relation between the time and the amount of the movement.

FIG. 5-(c) illustrates the record of the movement of an object moving vertically and horizontally. By stopping the rotation of the motor 314 shown in FIG. 4, (b) and rotating the rotary chopper 319, the flux is shielded at every prescribed interval t. Therefore, the position and moving velocity of the object at every time can be read. This is an example wherein a mechanism for shielding the flux emitted from the laser at every prescribed interval is further employed, and the progress of the movement of the object is printed together with a time marker.

FIG. 6 is a diagram illustrating another embodiment of the recording method according to the present invention. The flux emitted from a helium-cadmium laser 403 is swept in the horizontal plane in the direction indicated by the arrow in the drawing. Referential numerals 410 and 420 indicate two objects to be measured, the positional relationship between which should be determined in the vertical direction and photosensitive films 411 and 421 protected respectively by a dye filter are fixed on the objects 410 and 420 to be measured, respectively. The flux from a helium-cadmium laser 403 is, as shown in the drawing, printed on the photosensitive films 411 and 421 to record datum lines indicating the horizontal datum plane. This is an example of a method for recording datum lines for indicating relative positions of plural objects wherein, when it is necessary to determine the relative position in a predetermined direction among a plurality of objects, the datum point is transferred in the datum or reference plane vertical to said direction to print a line indicating the datum plane on each of the photosensitive films attached to the respective objects.

As is apparent from the foregoing description, if, according to the method of this invention, the datum point or datum plane formed by a helium-cadmium laser is directly printed and recorded on a photodevelopable photosensitive material including silver bromide as a main photosensitive element, which is protected by a suitable dye filter, various valuable means for recording movements of the objects to be measured and determining relative positions of the objects to be measured, which can be effectively and sufficiently employed outdoors, can be provided.

The embodiments of the invention in which an exclusive property or privilege is claimed are defined as follows:

1. A method for recording movements of objects or datum lines which comprises employing a photodevelopable photosensitive material, a dye filter having strong absorption in the ranges of wavelengths excluding the vicinity of the wavelength of the laser ray employed for the first exposure of light and a laser, fixing said photosensitive material protected from outdoor light by said filter to the object to be measured, and printing the datum point formed by the flux of the laser ray emitted from the laser on said photosensitive material through the filter.

2. A method according to claim 1, wherein the dye filter passes the laser ray at 442 nm in the inherent sensitivity of said photodevelopable photosensitive material and it contains a mixture of two dyes which absorb the rays in the ranges of wavelengths excluding the vicinity of 442 nm.

3. A method according to claim 2, wherein one of the dyes has an absorption region on the side of wavelengths longer than 442 nm and the other dye has an absorption region on the side of wavelengths shorter than 442 nm.

4. A method according to claim 1, wherein the dye filter is prepared by forming a dye filter layer directly on the surface of the photodevelopable photosensitive material.

5. A method according to claim 1, wherein the dye filter is prepared by dissolving the dye in a binder resin and coating the dye solution on a filter base to form a filter layer thereon.

6. A method according to claim 5, wherein said filter base is a transparent support made of a material selected from acetyl cellulose films, polystyrene films, polyethylene terephthalate films and glass.

7. A method according to claim 1, wherein said laser has a sweep mechanism for transferring the flux of the laser in a plane vertical to the movement of the object to be measured.

8. A method for recording movements of objects which comprises employing a photodevelopable photosensitive film, a dye filter having strong absorption to rays other than a ray of a wavelength of 442 nm and a helium-cadmium laser, fixing said photosensitive film protected from outdoor light by said filter to an object to be measured, and printing the position of the datum point formed by the flux of the ray of 442 nm wavelength on said photosensitive film.

* * * * *